(No Model.)

W. ESTY.
NEEDLE BED FOR KNITTING MACHINES.

No. 553,729. Patented Jan. 28, 1896.

Witnesses
Harry M. Kays
Alice W. Morrison

Inventor.
William Esty
by Macleod Calver & Randall
his Attorneys

UNITED STATES PATENT OFFICE.

WILLIAM ESTY, OF LACONIA, NEW HAMPSHIRE.

NEEDLE-BED FOR KNITTING-MACHINES.

SPECIFICATION forming part of Letters Patent No. 553,729, dated January 28, 1896.

Application filed August 22, 1894. Serial No. 520,963. (No model.)

*To all whom it may concern:*

Be it known that I, WILLIAM ESTY, a citizen of the United States, residing at Laconia, in the county of Belknap and State of New Hampshire, have invented certain new and useful Improvements in Needle-Beds for Knitting-Machines, of which the following is a specification, reference being had therein to the accompanying drawings.

The invention first will be described fully with reference to the accompanying drawings, after which the characteristic feature thereof will be particularly pointed out and distinctly defined in the claim at the close of this specification.

Figure 1:
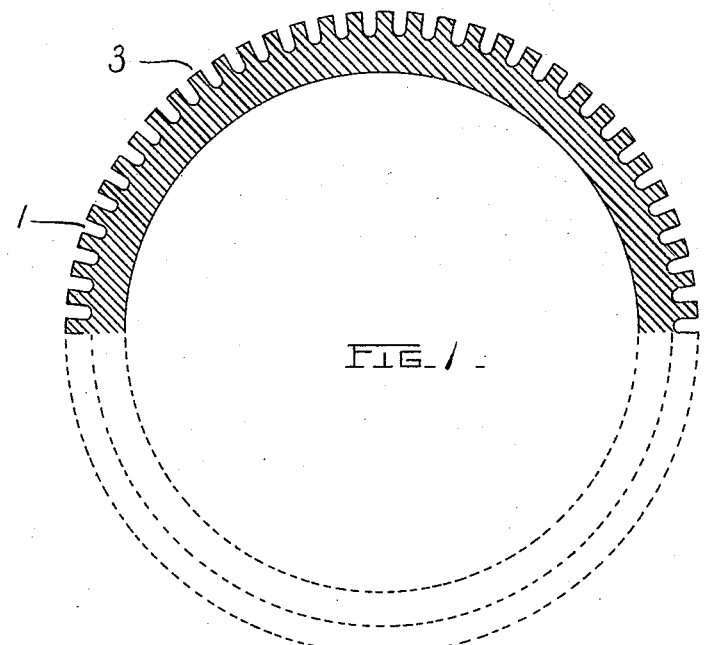
Figure 3:
Figure 2:
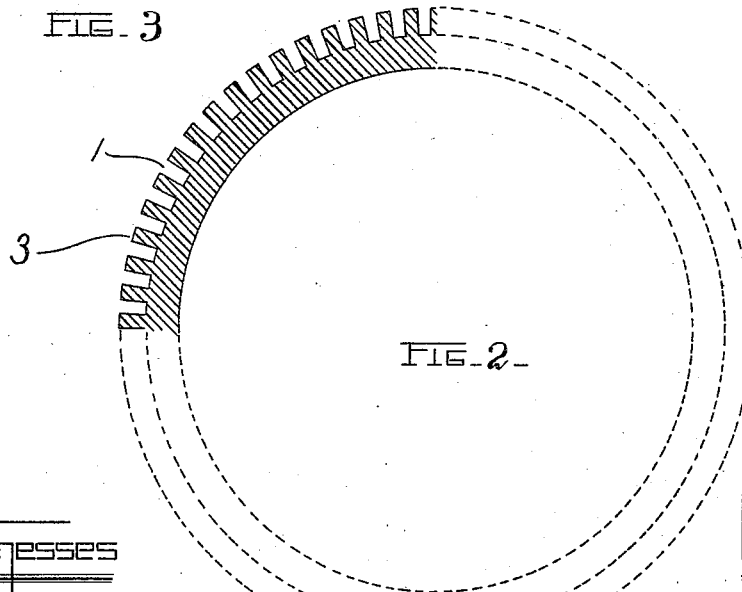

Figure 1 of the accompanying drawings shows in transverse section a cylindrical needle-bed for a knitting-machine, it being made in accordance with my invention. Fig. 2 shows in transverse section a needle-bed made as usual. Fig. 3 is a view showing in cross-section the shank or stem of an ordinary knitting-needle, this view being on a somewhat enlarged scale.

For convenience I have shown my invention applied to a cylindrical needle-bed or needle-cylinder; but, as will be obvious, the invention is equally well adapted to straight and other forms of needle-beds.

Knitting-machines of the kind in which the needles are given a reciprocating movement, for the purpose of effecting the knitting, are provided with needle-beds formed with needle-receiving grooves 1, (see Figs. 1 and 2,) in which the needles are caused to slide endwise. So far as I am aware the said grooves always have been formed as shown in Fig. 2 of the drawings—namely, square at the bottom, they being made by the use of a cutter having a square or straight edge. There are various disadvantages incident to a needle-bed having square-bottomed grooves. One of these is due to the fact that knitting-needles usually are made with stems or shanks which in cross-section are shaped as in Fig. 3—namely, rounded at the opposite edges thereof. When such a needle 2, Fig. 3, having the stem or shank thereof of the form that is represented in Fig. 3, is placed in a square-bottomed groove, such as that which is shown in Fig. 2, the needle is compelled to wear itself into a correct fit. Another and more serious disadvantage is the liability to breakage of the partitions 3. The entrant angles formed at the bottoms of the grooves weaken the partitions at their roots or bases. This liability to breakage increases when the needle-bed is cut fine.

With the object in view of strengthening the partitions I form the grooves 1 round-bottomed, as in Fig. 1. This removes all chances of a break starting.

My invention enables a needle-bed to be cut very fine.

I claim—

A needle-bed having round-bottomed grooves for the reception and guidance of the needles, substantially as described.

In testimony whereof I affix my signature in presence of two witnesses.

WILLIAM ESTY.

Witnesses:
O. W. TIBBETTS,
C. W. TYLER.